(12) United States Patent
Sun et al.

(10) Patent No.: US 12,067,690 B2
(45) Date of Patent: Aug. 20, 2024

(54) IMAGE PROCESSING METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Tianyu Sun, Shenzhen (CN); Haozhi Huang, Shenzhen (CN); Wei Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 405 days.

(21) Appl. No.: 17/497,883

(22) Filed: Oct. 8, 2021

(65) Prior Publication Data

US 2022/0028031 A1 Jan. 27, 2022

Related U.S. Application Data

(63) Continuation of application No. PCT/CN2020/117455, filed on Sep. 24, 2020.

(30) Foreign Application Priority Data

Nov. 5, 2019 (CN) .......................... 201911072470.8

(51) Int. Cl.
*G06T 3/04* (2024.01)
*G06F 18/214* (2023.01)
(Continued)

(52) U.S. Cl.
CPC .............. *G06T 3/04* (2024.01); *G06F 18/214* (2023.01); *G06N 3/045* (2023.01); *G06N 3/088* (2013.01);
(Continued)

(58) Field of Classification Search
CPC ........... G06T 3/04; G06T 9/00; G06V 40/174; G06V 40/168; G06V 10/95; G06F 18/214; G06N 3/045; G06N 3/088
See application file for complete search history.

(56) References Cited

U.S. PATENT DOCUMENTS 9,610,510 B2 4/2017 Comploi
10,825,219 B2 * 11/2020 Fu .......................... G06V 40/16
(Continued)

FOREIGN PATENT DOCUMENTS

CN 108921061 A 11/2018
CN 109190472 A 1/2019
(Continued)

OTHER PUBLICATIONS

Chen, Mingyi, et al. "Double encoder conditional GAN for facial expression synthesis." 2018 37th Chinese Control Conference (CCC). IEEE, 2018. (Year: 2018).*
(Continued)

*Primary Examiner* — Utpal D Shah
(74) *Attorney, Agent, or Firm* — ANOVA LAW GROUP PLLC (57) ABSTRACT

An image processing method is provided. The method includes: encoding an input image based on an attention mechanism to obtain an encoding tensor set and an attention map set of the input image; obtaining an encoding result of the input image according to the encoding tensor set and the attention map set, the encoding result of the input image recording an identity feature of a human face in the input image; encoding an expression image to obtain an encoding result of the expression image, the encoding result of the expression image recording an expression feature of a human face in the expression image; and generating an output image according to the encoding result of the input image and the encoding result of the expression image, the
(Continued)

output image having the identity feature of the input image and the expression feature of the expression image.

17 Claims, 5 Drawing Sheets

(51) Int. Cl.
  *G06N 3/045* (2023.01)
  *G06N 3/088* (2023.01)
  *G06T 9/00* (2006.01)
  *G06V 10/94* (2022.01)
  *G06V 40/16* (2022.01)
(52) U.S. Cl.
  CPC ............... *G06T 9/00* (2013.01); *G06V 10/95* (2022.01); *G06V 40/168* (2022.01); *G06V 40/174* (2022.01)

(56) References Cited

U.S. PATENT DOCUMENTS

| | | | | |
|---|---|---|---|---|
| 11,074,711 | B1* | 7/2021 | Akbas | G06V 10/454 |
| 2017/0157521 | A1 | 6/2017 | Comploi | |
| 2020/0294294 | A1* | 9/2020 | Petriv | G06N 3/08 |
| 2021/0056348 | A1* | 2/2021 | Berlin | G06T 11/60 |
| 2022/0222897 | A1* | 7/2022 | Yang | G06V 20/64 |

FOREIGN PATENT DOCUMENTS

| | | |
|---|---|---|
| CN | 109325422 A | 2/2019 |
| CN | 109508689 A | 3/2019 |
| CN | 109934116 A | 6/2019 |
| CN | 109934767 A | 6/2019 |
| CN | 110008846 A | 7/2019 |
| CN | 110135215 A | 8/2019 |
| CN | 110222588 A | 9/2019 |
| CN | 110796111 A | 2/2020 |

OTHER PUBLICATIONS

Zhang, Gang, et al. "Generative adversarial network with spatial attention for face attribute editing." Proceedings of the European conference on computer vision (ECCV). 2018. (Year: 2018).*
The State Intellectual Property Office of the People's Republic of China (SIPO) Office Action 1 for for 201911072470.8 Aug. 21, 2020 10 Pages (including translation).
The World Intellectual Property Organization (WIPO) International Search Report for PCT/CN2020/117455 Dec. 25, 2020 6 Pages (including translation).
Shuyang Gu et al. "Mask-Guided Portrait Editing with Conditional GANs", 2019 IEEE/CVF Conference on Computer Vision and Pattern Recognition (CVPR), Jul. 20, 2017 (Jul. 20, 2017). 10 pages.
Kudong Mao et al. "Least Squares Generative Adversarial Networks," Proceedings of the IEEE International Conference on Computer Vision, 2017, pp. 2794-2802. 9 pages.
Justin Johnson et al., "Perceptual Losses for Real-Time Style Transfer and Super-Resolution," European conference on computer vision. Springer, 2016, pp. 694-711. 18 pages.

* cited by examiner

IMAGE PROCESSING METHOD AND APPARATUS, DEVICE, AND STORAGE MEDIUM

RELATED APPLICATION(S)

This application is a continuation application of PCT Patent Application No. PCT/CN2020/117455 filed on Sep. 24, 2020, which claims priority to Chinese Patent Application No. 201911072470.8, entitled "IMAGE PROCESSING METHOD AND APPARATUS, DEVICE, AND STORAGE MEDIUM" and filed on Nov. 5, 2019, all of which are incorporated herein by reference in entirety.

FIELD OF THE TECHNOLOGY

The present disclosure relates to the field of computer vision technologies in artificial intelligence technologies, and in particular, to an image processing method and apparatus, a device, and a storage medium.

BACKGROUND

Facial expression editing (also referred to as facial expression transformation) is to adjust an expression in a face image to obtain another image. For example, an expression in an original image is smile, and after the facial expression editing, an obtained expression in a target image is crying. However, in solutions provided to implement the facial expression transformation, the expression transformation capability may be limited.

SUMMARY

Embodiments of the present disclosure provide an image processing method and apparatus, a device, and a storage medium, which can generate an output image with a large expression difference from an input image, thereby improving an expression transformation capability. The technical solutions are as follows.

In one aspect, the present disclosure provides an image processing method, applied to a computer device, and the method includes: encoding an input image based on an attention mechanism to obtain an encoding tensor set and an attention map set of the input image, the encoding tensor set including n encoding tensors, the attention map set including n attention maps, and n being an integer greater than 1; obtaining an encoding result of the input image according to the encoding tensor set and the attention map set, the encoding result of the input image recording an identity feature of a human face in the input image; encoding an expression image to obtain an encoding result of the expression image, the encoding result of the expression image recording an expression feature of a human face in the expression image; and generating an output image according to the encoding result of the input image and the encoding result of the expression image, the output image having the identity feature of the input image and the expression feature of the expression image.

In another aspect, the present disclosure provides an image processing apparatus, and the apparatus includes a memory storing computer program instructions; and a processor coupled to the memory and configured to execute the computer program instructions and perform: encoding an input image based on an attention mechanism to obtain an encoding tensor set and an attention map set of the input image; the encoding tensor set including n encoding tensors, the attention map set including n attention maps, and n being an integer greater than 1; obtaining an encoding result of the input image according to the encoding tensor set and the attention map set, the encoding result of the input image recording an identity feature of a human face in the input image; encoding an expression image to obtain an encoding result of the expression image, the encoding result of the expression image recording an expression feature of a human face in the expression image; and generating an output image according to the encoding result of the input image and the encoding result of the expression image, the output image having the identity feature of the input image and the expression feature of the expression image.

In yet another aspect, the present disclosure provides a non-transitory computer-readable storage medium storing computer program instructions executable by at least one processor to perform: encoding an input image based on an attention mechanism to obtain an encoding tensor set and an attention map set of the input image, the encoding tensor set including n encoding tensors, the attention map set including n attention maps, and n being an integer greater than 1; obtaining an encoding result of the input image according to the encoding tensor set and the attention map set, the encoding result of the input image recording an identity feature of a human face in the input image; encoding an expression image to obtain an encoding result of the expression image, the encoding result of the expression image recording an expression feature of a human face in the expression image; and generating an output image according to the encoding result of the input image and the encoding result of the expression image, the output image having the identity feature of the input image and the expression feature of the expression image.

The technical solutions provided in the embodiments of the present disclosure may bring the following beneficial effects.

An input image is encoded based on an attention mechanism to obtain an encoding tensor set and an attention map set of the input image, then an encoding result of the input image is obtained according to the encoding tensor set and the attention map set, and then an expression image is encoded to obtain an encoding result of the expression image. Because the encoding result of the input image records an identity feature of a human face in the input image and the encoding result of the expression image records an expression feature of a human face in the expression image, and an output image is generated according to the encoding result of the input image and the encoding result of the expression image, the output image has the identity feature of the input image and the expression feature of the expression image, and the expression feature of the output image is determined by the expression image instead of the input image. In this way, the generated output image can have a large expression difference from the input image, thereby improving an expression transformation capability.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In certain embodiments, the term "based on" is employed herein interchangeably with the term "according to."

Artificial intelligence (AI) is a theory, method, technology, and application system that use a digital computer or a machine controlled by the digital computer to simulate, extend, and expand human intelligence, perceive an environment, acquire knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as sensors, dedicated AI chips, cloud computing, distributed storage, the big data processing technology, the operating/interaction system, and electromechanical integration. AI software technologies include several directions such as the computer vision (CV) technology, the speech processing technology, the natural language processing technology, and machine learning/deep learning.

Computer vision (CV) technology is a science that studies how to enable a machine to "see", and to be specific, to implement machine vision such as recognition, tracking, measurement, and the like of a target by using a camera and a computer in replacement of human eyes, and to perform further graphic processing by using a computer to generate an image more suitable for human eyes to observe or more suitable for transmission to and detection by an instrument. As a scientific discipline, computer vision studies related theories and technologies and attempts to establish an artificial intelligence system that can obtain information from images or multi-dimensional data. The computer vision technologies generally include technologies such as image processing, image recognition, image semantic understanding, image retrieval, optical character recognition (OCR), video processing, video semantic understanding, video content/behavior recognition, three-dimensional object reconstruction, 3D technology, virtual reality, augmented reality, synchronous positioning, and map construction, and further include biometric feature recognition technologies such as common face recognition and fingerprint recognition.

Machine learning (ML) is a multi-field interdisciplinary subject, involving multiple disciplines such as the probability theory, statistics, approximation theory, convex analysis, and algorithm complexity theory. The machine learning specializes in studying how a computer simulates or implements a human learning behavior to acquire new knowledge or skills, and reorganize an existing knowledge structure to continuously improve its own performance. The machine learning is the core of AI, is a basic way to make the computer intelligent, and is applied to various fields of AI. Machine learning and deep learning generally involve technologies such as the artificial neural network, belief network, reinforcement learning, transfer learning, inductive learning, and learning from demonstrations.

With the research and progress of the artificial intelligence technology, the artificial intelligence technology is studied and applied in a plurality of fields such as the smart home, smart wearable device, virtual assistant, smart speaker, smart marketing, unmanned driving, automatic driving, unmanned aerial vehicle, robot, smart medical care, and smart customer service. It is believed that with the development of technologies, the AI technology will be applied to more fields, and play an increasingly important role.

An expression may be encoded by using spatial transformation, that is, the spatial transformation is performed on an original image to obtain a target image. Because an expression feature relies on spatial transformation to be encoded into the target image, pixel units not appearing in the original image cannot be generated. For example, if there is no teeth in the original image, there will be no teeth in the target image, so that the target image with a large expression difference from the original image cannot be generated, and an expression transformation capability is limited.

Solutions provided by the embodiments of the present disclosure involve the computer vision technology of artificial intelligence, and provide an image processing method. An input image is encoded based on an attention mechanism to obtain an encoding tensor set and an attention map set of the input image, then an encoding result of the input image is obtained according to the encoding tensor set and the attention map set, and then an expression image is encoded to obtain an encoding result of the expression image. Because the encoding result of the input image records an identity feature of a human face in the input image and the encoding result of the expression image records an expression feature of a human face in the expression image, and an output image is generated according to the encoding result of the input image and the encoding result of the expression image, the output image has the identity feature of the input image and the expression feature of the expression image, and the expression feature of the output image is determined by the expression image instead of the input image. In this way, the generated output image can have a large expression difference from the input image, thereby improving the expression transformation capability.

According to the method provided by the embodiments of the present disclosure, steps of the method may be performed by a computer device, which may be any electronic device with processing and storage capabilities, such as a mobile phone, a tablet computer, a game device, a multimedia playback device, an electronic photo frame, a wearable device, and a personal computer (PC), and may also be a server. In certain embodiments, the term "computer device" is employed herein interchangeably with the term "computing device." For ease of description, in the following method embodiments, the steps are performed by a computer device, which, however, does not constitute a limitation.

Figure 1:
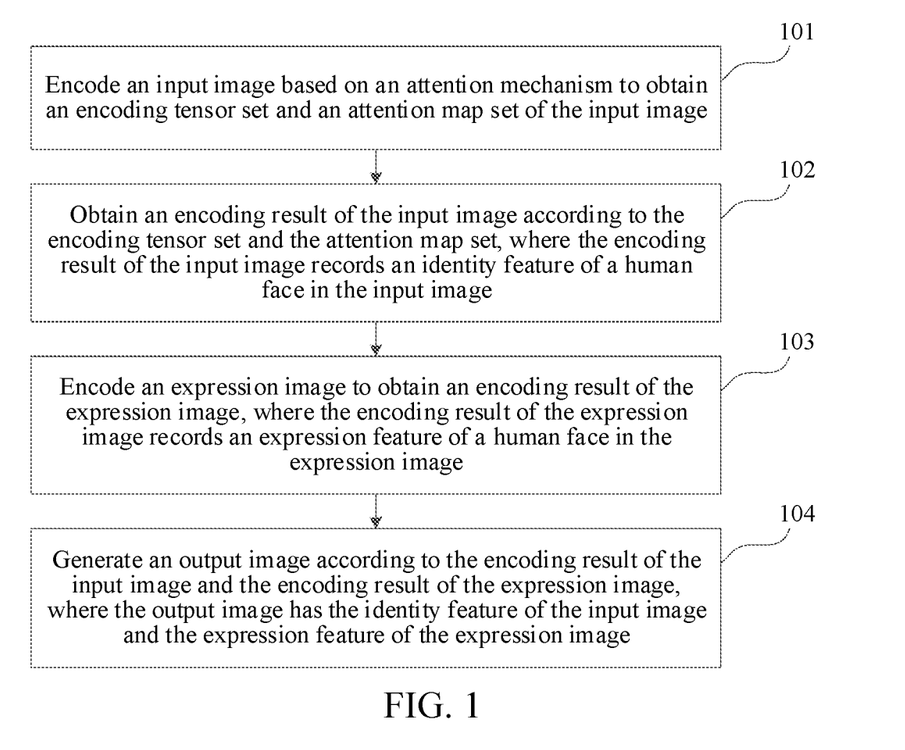
FIG. 1 is a schematic flowchart of an image processing method according to one or more embodiments of the present disclosure.

FIG. 1 is a flowchart of an image processing method provided by an embodiment of the present disclosure. The method may include the following steps (101 to 104).

Step 101. Encode an input image based on an attention mechanism to obtain an encoding tensor set and an attention map set of the input image.

In an embodiment of the present disclosure, the input image is a human face image, that is, an image containing a human face. Multichannel encoding is performed on the input image based on the attention mechanism to obtain the encoding tensor set and the attention map set of the input image. The encoding tensor set includes n encoding tensors, the attention map set includes n attention maps, and n is an integer greater than 1. The value of n may be preset according to actual requirements, for example, the value of n is set to 8.

The input image may be encoded by using a first encoder to obtain the encoding tensor set and the attention map set of the input image. The first encoder is configured to extract an image feature of the input image and encode the image feature to obtain the two sets. In an embodiment of the present disclosure, the first encoder is an imaginative encoder. An imagination module is embedded in the first encoder, which enables the first encoder to generate a plurality of encoding tensors of the input image. A plurality of expressions of the input image are encoded in the plurality of encoding tensors, thereby obtaining pixel units that are relatively more diversified. In addition, in the imagination module, the attention mechanism is embedded to obtain intuitive understanding of an expression encoded by each subunit through visual observation.

The attention mechanism is a pixel-based information enhancement mechanism for a specific target in a feature map that uses an attention mechanism similar to human eyes in deep learning, that is, the attention mechanism can enhance target information in the feature map. After the feature map is processed based on the attention mechanism, the target information in the feature map will be enhanced. The attention-enhanced feature map can enhance target-based voxel level information.

Assume that the input image is a 256×256×3 image, where 256×256 represents a resolution of the input image, and 3 represents three channels RGB. When n is 8, after the first encoder encodes the input image, the obtained encoding tensor set includes eight 256×256×3 encoding tensors, and the obtained attention map set includes eight 256×256×1 attention maps, where the eight encoding tensors are in one-to-one correspondence to the eight attention maps.

In certain embodiments, the first encoder may use a U-Net structure. The U-Net is an image segmentation model based on Convolutional Neural Network (CNN), including a convolution layer, a max pooling layer (downsampling), a deconvolution layer (upsampling), and a Rectified Linear Unit (ReLU) layer. In some other embodiments, the first encoder may also use other network architectures. This is not limited in the embodiments of the present disclosure.

Step 102. Obtain an encoding result of the input image according to the encoding tensor set and the attention map set, where the encoding result of the input image records an identity feature of a human face in the input image.

The identity feature refers to feature information used for distinguishing faces of different people. In an embodiment of the present disclosure, in addition to the identity feature of the human face in the input image, the encoding result of the input image further records an appearance feature of the human face in the input image, so that a final generated output image has the same identity feature and appearance feature as the input image. The appearance feature refers to feature information used for reflecting an external appearance attribute of a human face.

In certain embodiments, for each group of a corresponding encoding tensor and a corresponding attention map in the encoding tensor set and the attention map set, the encoding tensor and the attention map are multiplied to obtain n processed encoding tensors, where the encoding result of the input image includes the n processed encoding tensors.

Assume that the input image is x, the encoding tensor set of the input image is E, the attention map set is A, the number of elements in E and A are both n, and n is an integer greater than 1. The encoding result $E_S(x)$ of the input image x is expressed as:

$$E_S(x)=\{e_i \otimes a_i, 1 \leq i \leq n\}, \text{ where}$$

$e_i$ represents an $i^{th}$ encoding tensor in the encoding tensor set E, and $a_i$ represents an $i^{th}$ attention map in the attention map set.

Assuming that the encoding tensor set includes eight 256×256×3 encoding tensors, and the attention map set includes eight 256×256×1 attention maps, the encoding result of the input image obtained after the operation includes eight 256×256×3 processed encoding tensors.

Step 103. Encode an expression image to obtain an encoding result of the expression image, where the encoding result of the expression image records an expression feature of a human face in the expression image.

The expression image is a face image used for providing an expression feature. In an embodiment of the present disclosure, the expression feature of the human face in the expression image is extracted by encoding the expression image, so that the final generated output image has the same identity feature and appearance feature as the input image, and has the same expression feature as the expression image. That is, the final output image is obtained by transforming the expression of the human face in the expression image into the input image and maintaining the identity feature and appearance feature of the human face in the input image.

The encoding result of the expression image includes a displacement map set. The displacement map set includes n displacement maps, where an $i^{th}$ displacement map is used for performing spatial transformation processing on an $i^{th}$ processed encoding tensor. Assuming that the expression image is y, the encoding result $E_T(y)$ of the expression image y is expressed as:

$$E_T(y)=\{O_i, 1\le i\le n\}, \text{where}$$

$O_i$ represents an $i^{th}$ displacement map in the displacement map set O.

Exemplarily, the encoding result of the expression image may include eight 256×256×2 displacement maps. The $i^{th}$ 256×256×2 displacement map is used as an example. The displacement map includes two 256×256 displacement maps. Element values of a pixel at position (x, y) in the two 256×256 displacement maps are recorded as x' and y', indicating that the pixel at position (x, y) is moved to (x', y') in the $i^{th}$ processed encoding tensor.

The expression image may be encoded by using a second encoder to obtain the encoding result of the expression image. The second encoder is configured to extract an image feature of the expression image and encode the image feature to obtain a displacement map set as the encoding result of the expression image.

In addition, the network structures of the second encoder and the first encoder may be the same or different. This is not limited in the embodiments of the present disclosure.

Step 104. Generate the output image according to the encoding result of the input image and the encoding result of the expression image, where the output image has the identity feature of the input image and the expression feature of the expression image.

The identity feature carried in the encoding result of the input image is mixed with the expression feature carried in the encoding result of the expression image, and then the output image is reconstructed, so that the output image has the identity feature of the input image and the expression feature of the expression image.

In certain embodiments, for each group of a corresponding processed encoding tensor and a corresponding displacement map, the displacement map is used for performing spatial transformation processing on the processed encoding tensor to obtain n transformed encoding tensors; and the n transformed encoding tensors are decoded to generate the output image. Directly splicing the expression image and the processed encoding tensors may cause the identity feature of the expression image to escape into the final output image. Considering this, in an embodiment of the present disclosure, a final training objective of the second encoder is set to learn a suitable displacement map. The displacement map is used for performing spatial transformation processing on the processed encoding tensor to obtain the transformed encoding tensor, and the transformed encoding tensor is decoded to generate the output image, so that the output image records only the identity feature of the input image, but not the identity feature of the expression image.

In certain embodiments, the transformed encoding tensor set F is expressed as:

$$F=ST(E_S(x),O), \text{where}$$

ST represents the spatial transformation processing. After the spatial transformation processing, the transformed encoding tensor set F includes n transformed encoding tensors, and finally a decoder decodes the n transformed encoding tensors to generate the output image R:

$$R=D_R(\{F_i, 1\le i\le n\}), \text{where}$$

$F_i$ represents an $i^{th}$ transformed encoding tensor, and $D_R$ represents decoding processing.

Figure 2:
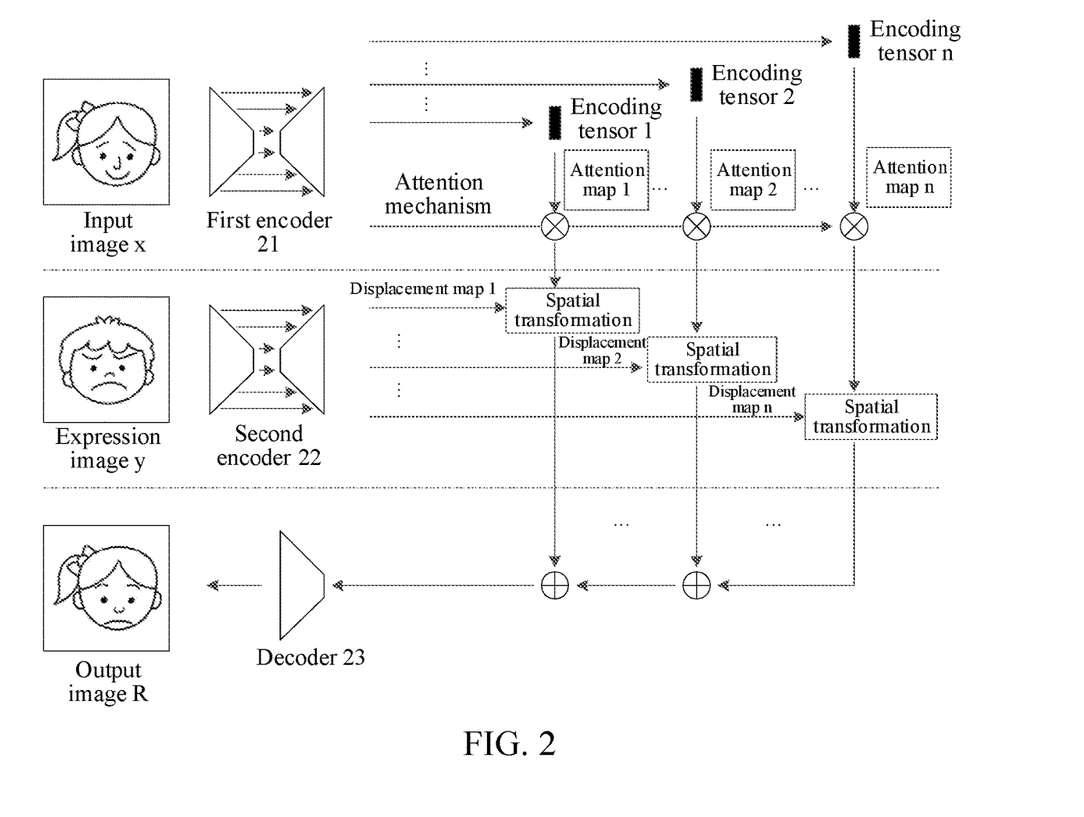
FIG. 2 is a schematic diagram of a facial expression editing model according to one or more embodiments of the present disclosure.

In an exemplary embodiment, the step 101 to step 104 may be implemented by a trained or pre-trained facial expression editing model. The facial expression editing model is invoked to generate the output image based on the input image and the expression image. FIG. 2 is an exemplary schematic diagram of a facial expression editing model. The facial expression editing model includes: a first encoder 21, a second encoder 22, and a decoder 23. The first encoder 21 is configured to encode an input image x based on an attention mechanism to obtain an encoding tensor set and an attention map set of the input image x, and to obtain an encoding result of the input image x according to the encoding tensor set and the attention map set. The second encoder 22 is configured to encode an expression image y to obtain an encoding result of the expression image. The decoder 23 is configured to generate an output image R according to the encoding result of the input image x and the encoding result of the expression image y. For example, as shown in FIG. 2, the input image x is a girl with a smiling expression, and the expression image y is a boy with a sad expression. After the expression transformation processing, the final generated output image R has the identity feature of the input image x and the expression feature of the expression image y, that is, the output image R is a girl with a sad expression.

In certain embodiments, after the expression transformation is performed on the input image to generate the output image, a video or a dynamic picture including the output image may be generated. For example, the expression transformation processing described above may be performed on a plurality of input images to generate a plurality of output images accordingly, and then the plurality of output images are combined into a video or a dynamic picture.

In summary, in the technical solutions provided in the embodiments of the present disclosure, an input image is encoded based on an attention mechanism to obtain an encoding tensor set and an attention map set of the input image, then an encoding result of the input image is obtained according to the encoding tensor set and the attention map set, and then an expression image is encoded to obtain an encoding result of the expression image. Because the encoding result of the input image records an identity feature of a human face in the input image and the encoding result of the expression image records an expression feature of a human face in the expression image, and an output image is generated according to the encoding result of the input image and the encoding result of the expression image, the output image has the identity feature of the input image and the expression feature of the expression image, and the expression feature of the output image is determined by the expression image instead of the input image. In this way, the generated output image can have a large expression difference from the input image, thereby improving an expression transformation capability.

In addition, multichannel encoding is performed on the input image to generate a plurality of encoding tensors of the input image. A plurality of expressions of the input image are encoded in the plurality of encoding tensors, thereby obtaining pixel units that are relatively more diversified. In addition, the attention mechanism is embedded to obtain intuitive understanding of an expression encoded by each subunit through visual observation.

Figure 3:
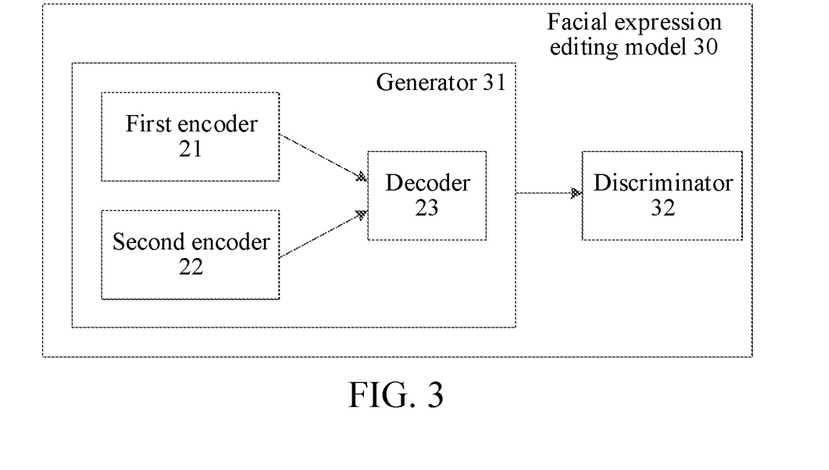
FIG. 3 is a schematic diagram of a facial expression editing model according to one or more embodiments of the present disclosure.

In an exemplary embodiment, the facial expression editing model described above is a model constructed based on a generative adversarial network. As shown in FIG. 3, a facial expression editing model 30 includes a generator 31 and a discriminator 32. The generator 31 includes a first encoder 21, a second encoder 22, and a decoder 23.

A training process of the facial expression editing model 30 is as follows.

1. Obtain at least one training sample, each of the training sample being an image pair including an original image and a target image, the original image and the target image being two images of a same human face, and the original image and the target image having different expressions, where the generator is configured to generate an output image corresponding to the original image according to the original image and the target image, and the discriminator is configured to determine whether the output image corresponding to the original image and the target image are the image generated by the generator.

2. Use the training sample to train the facial expression editing model.

In an embodiment of the present disclosure, the facial expression editing model is constructed based on the generative adversarial network, and the image pair included in the training sample is two images of the same human face with different expressions. The generator is configured to perform the face expression transformation processing described above to generate the output image corresponding to the original image, and the discriminator uses adversarial learning to adjust and optimize parameters of the generator, so that the output image corresponding to the original image generated by the generator is as similar as possible to the target image. In certain embodiments, a Least Squares Generative Adversarial Network (LSGAN) may be selected as the generative adversarial network.

In certain embodiments, a loss function $L_{total}$ of the facial expression editing model is:

$$L_{total}=L_{L_1}+\lambda_{LSGAN}L_{LSGAN}+\lambda_P L_P+\lambda_O L_O, \text{ where}$$

$L_{L_1}$ represents a first-order distance loss, that is, Manhattan distance in a pixel dimension, $L_{LSGAN}$, $L_P$, and $L_O$ respectively represent a least squares generative adversarial network loss, a perceptual loss, and an overlapping penalty loss, $\lambda_{LSGAN}$, $\lambda_P$ and $\lambda_O$ respectively represent weights corresponding to the three losses. The weights corresponding to the three losses may be preset according to an actual situation, which is not limited in the embodiments of the present disclosure. In the overlapping penalty loss $L_O=\Sigma_{i=1}^n \sigma(a)-1$, a∈A, A represents the attention map set, and σ(a) represents a sigmoid function of a. In an embodiment of the present disclosure, to make full use of channel width, the overlapping penalty loss $L_O$ is introduced to encourage the use of different encoding tensors to encode different parts of an image.

In summary, in the technical solutions provided in the embodiments of the present disclosure, a generative adversarial network in a self-supervised mode is used for training the generator, and additional labeling may not be needed. Rules for the facial expression transformation are learned from unlabeled data, which helps to reduce training cost of the model and improving training efficiency of the model.

The following describes apparatus embodiments of the present disclosure, which can be used for performing the method embodiments of the present disclosure. For details not disclosed in the apparatus embodiments of the present disclosure, refer to the method embodiments of the present disclosure.

Figure 4:
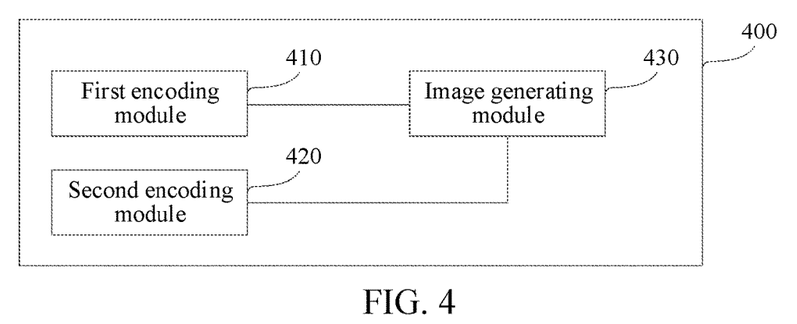
FIG. 4 is a schematic block diagram of an image processing apparatus according to one or more embodiments of the present disclosure.

FIG. 4 is a block diagram of an image processing apparatus provided by an embodiment of the present disclosure. The apparatus has a function of implementing the method example. The function may be implemented by using hardware or may be implemented by hardware executing corresponding software. The apparatus may be a computer device or may be disposed in a computer device. The apparatus 400 may include: a first encoding module 410, a second encoding module 420, and an image generating module 430.

The first encoding module 410 is configured to encode an input image based on an attention mechanism to obtain an encoding tensor set and an attention map set of the input image. The encoding tensor set includes n encoding tensors, the attention map set includes n attention maps, and n is an integer greater than 1.

The first encoding module 410 is further configured to obtain an encoding result of the input image according to the encoding tensor set and the attention map set. The encoding result of the input image records an identity feature of a human face in the input image.

The second encoding module 420 is configured to encode an expression image to obtain an encoding result of the expression image. The encoding result of the expression image records an expression feature of a human face in the expression image.

The image generating module 430 is configured to generate an output image according to the encoding result of the input image and the encoding result of the expression image. The output image has the identity feature of the input image and the expression feature of the expression image.

In an exemplary embodiment, the first encoding module 410 is configured to multiply, for each group of a corresponding encoding tensor and a corresponding attention map in the encoding tensor set and the attention map set, the encoding tensor and the attention map to obtain n processed encoding tensors, where the encoding result of the input image includes the n processed encoding tensors.

In an exemplary embodiment, the encoding result of the expression image includes n displacement maps.

The image generating module 430 is configured to: perform spatial transformation processing, for each group of a corresponding processed encoding tensor and a corresponding displacement map, on the processed encoding tensor by using the displacement map to obtain n transformed encoding tensors; and decode the n transformed encoding tensors to generate the output image.

Figure 5:
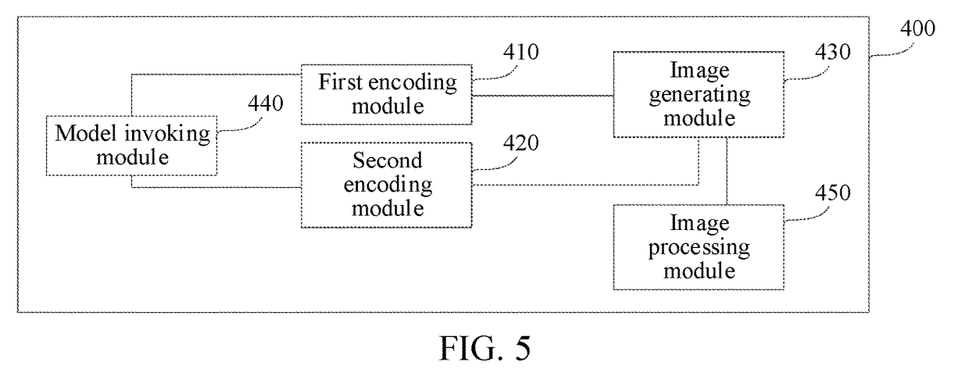
FIG. 5 is a schematic block diagram of an image processing apparatus according to one or more embodiments of the present disclosure.

In an exemplary embodiment, as shown in FIG. 5, the apparatus 400 further includes: a model invoking module 440, configured to invoke a facial expression editing model, the facial expression editing model including: a first encoder, a second encoder, and a decoder; where the first encoder is configured to encode the input image based on the attention mechanism to obtain the encoding tensor set and the attention map set of the input image, and to obtain the encoding result of the input image according to the encoding tensor set and the attention map set; the second encoder is configured to encode the expression image to obtain the encoding result of the expression image; and the decoder is configured to generate the output image according to the encoding result of the input image and the encoding result of the expression image.

In an exemplary embodiment, the facial expression editing model is a model constructed based on a generative adversarial network. The facial expression editing model includes a generator and a discriminator. The generator includes the first encoder, the second encoder, and the decoder.

A training process of the facial expression editing model includes: obtaining at least one training sample, each of the training sample being an image pair including an original image and a target image, the original image and the target image being two images of a same human face, and the original image and the target image having different expressions, where the generator is configured to generate an output image corresponding to the original image according to the original image and the target image, and the discriminator is configured to determine whether the output image corresponding to the original image and the target image are the image generated by the generator; and using the training sample to train the facial expression editing model.

In an exemplary embodiment, a loss function $L_{total}$ of the facial expression editing model is:

$$L_{total} = L_{L_1} + \lambda_{LSGAN} L_{LSGAN} + \lambda_P L_P + \lambda_O L_O, \text{ where}$$

$L_{L_1}$ represents a first-order distance loss, $L_{LSGAN}$, $L_P$, and $L_O$ respectively represent a least squares generative adversarial network loss, a perceptual loss, and an overlapping penalty loss, $\lambda_{LSGAN}$, $\lambda_P$, and $\lambda_O$ respectively represent weights corresponding to the three losses, and in the overlapping penalty loss $L_O = \Sigma_{i=1}^n \sigma(a) - 1$, $a \in A$, A represents the attention map set, and $\sigma(a)$ represents a sigmoid function of a.

In an exemplary embodiment, as shown in FIG. 5, the apparatus 400 further includes: an image processing module 450, configured to generate a video or a dynamic picture including the output image.

In summary, in the technical solutions provided in the embodiments of the present disclosure, an input image is encoded based on an attention mechanism to obtain an encoding tensor set and an attention map set of the input image, then an encoding result of the input image is obtained according to the encoding tensor set and the attention map set, and then an expression image is encoded to obtain an encoding result of the expression image. Because the encoding result of the input image records an identity feature of a human face in the input image and the encoding result of the expression image records an expression feature of a human face in the expression image, and an output image is generated according to the encoding result of the input image and the encoding result of the expression image, the output image has the identity feature of the input image and the expression feature of the expression image, and the expression feature of the output image is determined by the expression image instead of the input image. In this way, the generated output image can have a large expression difference from the input image, thereby improving an expression transformation capability.

When the apparatus provided in the embodiments implements functions of the apparatus, it is illustrated with an example of division of each functional module. In a practical implementation, the functions may be distributed to different functional modules according to the requirements, that is, the internal structure of the device is divided into different functional modules, to implement all or some of the functions described above. In addition, the apparatus embodiments and the method embodiments provided in the embodiments belong to one conception. For the specific implementation process, refer to the method embodiments, and details are not described herein again.

Figure 6:
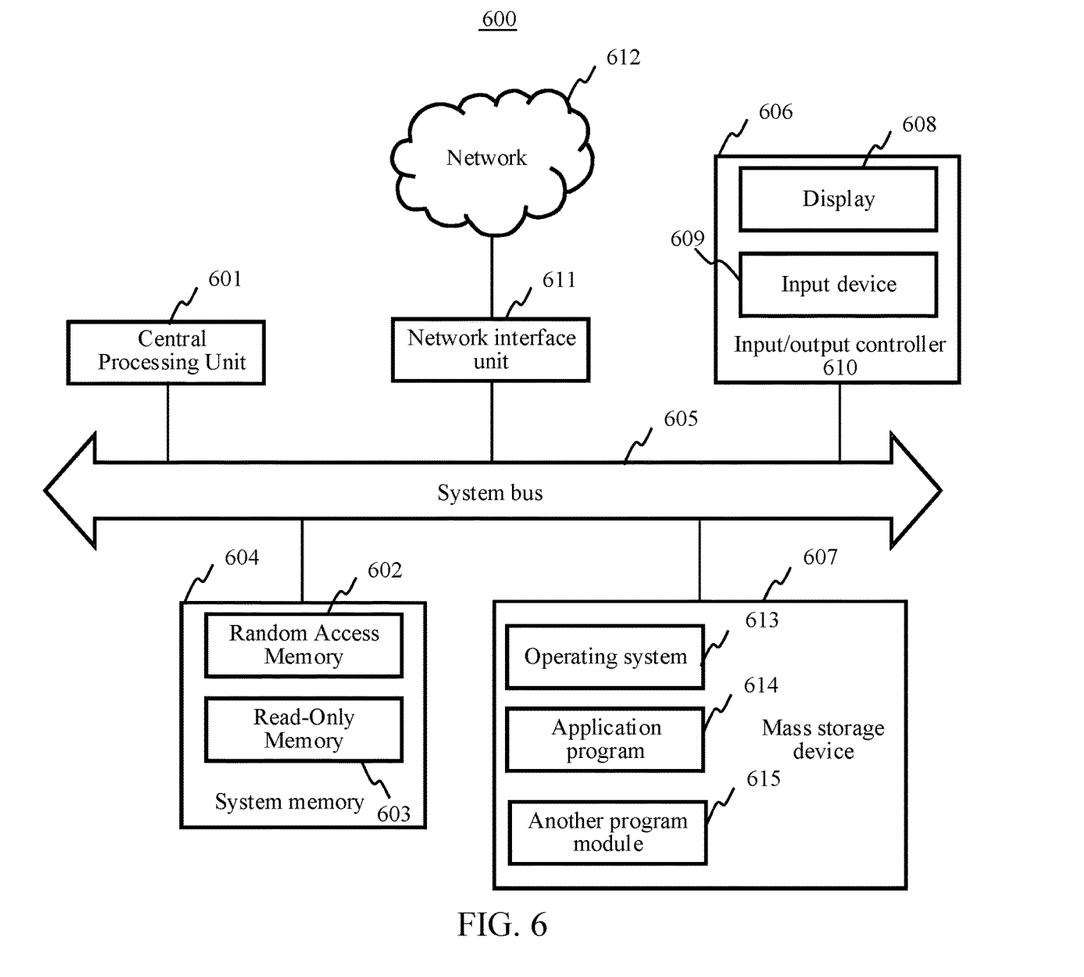
FIG. 6 is a schematic structural block diagram of a computer device according to one or more embodiments of the present disclosure.

FIG. 6 is a schematic structural diagram of a computer device according to an embodiment of the present disclosure.

A computer device 600 includes a Central Processing Unit (CPU) 601, a system memory 604 including a Random Access Memory (RAM) 602 and a Read-Only Memory (ROM) 603, and a system bus 605 connecting the system memory 604 and the central processing unit 601. The computer device 600 further includes a basic input/output (I/O) system 606 assisting in transmitting information between components in the computer, and a mass storage device 607 configured to store an operating system 613, an application program 614, and another program module 615.

The basic input/output system 606 includes a display 608 configured to display information and an input device 609 such as a mouse and a keyboard for a user to input information. The display 608 and the input device 609 are both connected to the CPU 601 by an input/output controller 610 connected to the system bus 605. The basic input/output system 606 may further include the input/output controller 610 for receiving and processing input from a plurality of other devices such as a keyboard, a mouse, and an electronic stylus. Similarly, the input/output controller 610 further provides an output to a display screen, a printer or another type of an output device.

The mass storage device 607 is connected to the CPU 601 through a mass storage controller (not shown) connected to the system bus 605. The mass storage device 607 and an associated computer readable medium provide non-volatile storage for the computer device 600. That is, the mass storage device 607 may include a computer readable medium (not shown) such as a hard disk or a Compact Disc Read-Only Memory (CD-ROM) drive.

Without loss of generality, the computer readable medium may include a computer storage medium and a communication medium. The computer storage medium includes volatile and non-volatile media, and removable and non-removable media implemented by using any method or technology used for storing information such as computer readable instructions, data structures, program modules, or other data. The computer storage medium includes a Random Access Memory (RAM), a Read-Only Memory (ROM), an Erasable Programmable Read-Only Memory (EPROM), a flash memory or another solid-state memory technology, a Compact Disc Read-Only Memory (CD-ROM), or another optical memory, a tape cartridge, a magnetic cassette, a magnetic disk memory, or another magnetic storage device. A person skilled in the art may learn that the computer storage medium is not limited to the several types. The system memory 604 and the mass storage device 607 may be collectively referred to as a memory.

According to the various embodiments of the present disclosure, the computer device 600 may further be connected, through a network such as the Internet, to a remote computer on the network for running. That is, the computer device 600 may be connected to a network 612 by using a network interface unit 611 connected to the system bus 605, or may be connected to another type of network or a remote computer system (not shown) by using the network interface unit 611.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The memory further includes at least one instruction, at least one program, a code set, or an instruction set. The at least one instruction, the at least one program, the code set, or the instruction set is stored in the memory and is configured to be executed by one or more processors to implement the image processing method.

In an exemplary embodiment, a computer readable storage medium is further provided, the storage medium storing at least one instruction, at least one program, a code set, or an instruction set, the at least one instruction, the at least one program, the code set, or the instruction set, when executed by the processor of a terminal, implementing the image processing method.

In certain embodiments, the computer readable storage medium may include: a ROM, a RAM, a Solid State Drive (SSD), an optical disc, or the like. The RAM may include a Resistance Random Access Memory (ReRAM) and a Dynamic Random Access Memory (DRAM).

In an exemplary embodiment, a computer program product is further provided, the computer program product, when executed by the processor of a terminal, implementing the image processing method.

"Plurality of" mentioned in the present disclosure means two or more. "And/or" describes an association relationship for describing associated objects and represents that three relationships may exist. For example, A and/or B may represent the following three implementations: Only A exists, both A and B exist, and only B exists. The character "/" in the present disclosure generally indicates an "or" relationship between the associated objects. In addition, the step numbers described in the present disclosure merely exemplarily show a performing sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of the present disclosure.

The descriptions are merely exemplary embodiments of the present disclosure, but are not intended to limit the present disclosure. Any modification, equivalent replacement, or improvement made within the spirit and principle of the present disclosure all fall within the protection scope of the present disclosure.

What is claimed is:

1. An image processing method, applied to a computer device, the method comprising:
   encoding an input image based on an attention mechanism to obtain an encoding tensor set and an attention map set of the input image, the encoding tensor set including n encoding tensors, the attention map set including n attention maps, and n being an integer greater than 1, comprising:
   determining, for each group of a corresponding encoding tensor and a corresponding attention map in the encoding tensor set and the attention map set, a processed encoding tensor based on the encoding tensor and the attention map, to obtain n processed encoding tensors;
   obtaining an encoding result of the input image according to the encoding tensor set and the attention map set, the encoding result of the input image recording an identity feature of a human face in the input image;
   encoding an expression image to obtain an encoding result of the expression image, the encoding result of the expression image recording an expression feature of a human face in the expression image; and
   generating an output image according to the encoding result of the input image and the encoding result of the expression image, the output image having the identity feature of the input image and the expression feature of the expression image, the encoding result of the expression image including n displacement maps, comprising:
   performing spatial transformation processing, for each group of a corresponding processed encoding tensor and a corresponding displacement map, on the processed encoding tensor to obtain n transformed encoding tensors; and
   decoding the n transformed encoding tensors to generate the output image.

2. The method according to claim 1, wherein obtaining the encoding result of the input image comprises:
   multiplying, for each group of the corresponding encoding tensor and the corresponding attention map in the encoding tensor set and the attention map set, the encoding tensor and the attention map to obtain the n processed encoding tensors, wherein the encoding result of the input image includes the n processed encoding tensors.

3. The method according to claim 1, further comprising:
   invoking a facial expression editing model, the facial expression editing model including a first encoder, a second encoder, and a decoder, wherein:
   the first encoder is configured to encode the input image based on the attention mechanism to obtain the encoding tensor set and the attention map set of the input image, and to obtain the encoding result of the input image according to the encoding tensor set and the attention map set;
   the second encoder is configured to encode the expression image to obtain the encoding result of the expression image; and
   the decoder is configured to generate the output image according to the encoding result of the input image and the encoding result of the expression image.

4. The method according to claim 3, wherein the facial expression editing model is a model constructed based on a generative adversarial network, the facial expression editing model includes a generator and a discriminator, and the generator includes the first encoder, the second encoder, and the decoder, and wherein a training process of the facial expression editing model comprises:
   obtaining at least one training sample, each of the training sample being an image pair including an original image and a target image, the original image and the target image being two images of a same human face, and the original image and the target image having different expressions, wherein the generator is configured to generate an output image corresponding to the original image according to the original image and the target image, and the discriminator is configured to determine whether the output image corresponding to the original image and the target image are the image generated by the generator; and
   using the training sample to train the facial expression editing model.

5. The method according to claim 3, wherein a loss function of the facial expression editing model $L_{total}$ is:

$$L_{total} = L_{L_1} + \lambda_{LSGAN} L_{LSGAN} + \lambda_P L_P + \lambda_O L_O, \text{ wherein}$$

$L_{L_1}$ represents a first-order distance loss, $L_{LSGAN}$, $L_P$, and $L_O$ respectively represent a least squares generative adversarial network loss, a perceptual loss, and an overlapping penalty loss, $\lambda_{LSGAN}$, $\lambda_P$, and $\lambda_O$ respectively represent weights corresponding to the three losses, and in the overlapping penalty loss $L_O = \Sigma_{i=1}^{n} \sigma$ (a)−1,a∈A, represents the attention map set, and σ(a) represents a sigmoid function of a.

6. The method according to claim 1, further comprising: generating a video or a dynamic picture including the output image.

7. An image processing apparatus, comprising: a memory storing computer program instructions; and a processor coupled to the memory and configured to execute the computer program instructions and perform:
encoding an input image based on an attention mechanism to obtain an encoding tensor set and an attention map set of the input image; the encoding tensor set including n encoding tensors, the attention map set including n attention maps, and n being an integer greater than 1, comprising:
   determining, for each group of a corresponding encoding tensor and a corresponding attention map in the encoding tensor set and the attention map set, a processed encoding tensor based on the encoding tensor and the attention map, to obtain n processed encoding tensors;
obtaining an encoding result of the input image according to the encoding tensor set and the attention map set, the encoding result of the input image recording an identity feature of a human face in the input image;
encoding an expression image to obtain an encoding result of the expression image, the encoding result of the expression image recording an expression feature of a human face in the expression image; and
generating an output image according to the encoding result of the input image and the encoding result of the expression image, the output image having the identity feature of the input image and the expression feature of the expression image, the encoding result of the expression image including n displacement maps, comprising:
   performing spatial transformation processing, for each group of a corresponding processed encoding tensor and a corresponding displacement map, on the processed encoding tensor to obtain n transformed encoding tensors; and
   decoding the n transformed encoding tensors to generate the output image.

8. The apparatus according to claim 7, wherein obtaining the encoding result of the input image includes:
multiplying, for each group of the corresponding encoding tensor and the corresponding attention map in the encoding tensor set and the attention map set, the encoding tensor and the attention map to obtain the n processed encoding tensors, wherein the encoding result of the input image includes the n processed encoding tensors.

9. The apparatus according to claim 7, wherein the processor is further configured to execute the computer program instructions and perform:
invoking a facial expression editing model, the facial expression editing model including a first encoder, a second encoder, and a decoder, wherein:
   the first encoder is configured to encode the input image based on the attention mechanism to obtain the encoding tensor set and the attention map set of the input image, and to obtain the encoding result of the input image according to the encoding tensor set and the attention map set;
   the second encoder is configured to encode the expression image to obtain the encoding result of the expression image; and
   the decoder is configured to generate the output image according to the encoding result of the input image and the encoding result of the expression image.

10. The apparatus according to claim 9, wherein the facial expression editing model is a model constructed based on a generative adversarial network, the facial expression editing model includes a generator and a discriminator, and the generator includes the first encoder, the second encoder, and the decoder, and wherein a training process of the facial expression editing model includes:
obtaining at least one training sample, each of the training sample being an image pair including an original image and a target image, the original image and the target image being two images of a same human face, and the original image and the target image having different expressions, wherein the generator is configured to generate an output image corresponding to the original image according to the original image and the target image, and the discriminator is configured to determine whether the output image corresponding to the original image and the target image are the image generated by the generator; and
using the training sample to train the facial expression editing model.

11. The apparatus according to claim 7, wherein the processor is further configured to execute the computer program instructions and perform:
generating a video or a dynamic picture including the output image.

12. The apparatus according to claim 7, wherein a loss function of the facial expression editing model $L_{total}$ is:

$$L_{total}=L_{L_1}+\lambda_{LSGAN}L_{LSGAN}+\lambda_P L_P+\lambda_O L_O, \text{ wherein}$$

$L_{L_1}$ represents a first-order distance loss, $L_{LSGAN}$, $L_P$, and $L_O$ respectively represent a least squares generative adversarial network loss, a perceptual loss, and an overlapping penalty loss, $\lambda_{LSGAN}$, $\lambda_P$, and $\lambda_O$ respectively represent weights corresponding to the three losses, and in the overlapping penalty loss $L_O=\Sigma_{i=1}^{n}\sigma$ (a)−1, a∈A, A represents the attention map set, and σ(a) represents a sigmoid function of a.

13. A non-transitory computer-readable storage medium storing computer program instructions executable by at least one processor to perform:
encoding an input image based on an attention mechanism to obtain an encoding tensor set and an attention map set of the input image, the encoding tensor set including n encoding tensors, the attention map set including n attention maps, and n being an integer greater than 1, comprising:
   determining, for each group of a corresponding encoding tensor and a corresponding attention map in the encoding tensor set and the attention map set, a processed encoding tensor based on the encoding tensor and the attention map, to obtain n processed encoding tensors;
obtaining an encoding result of the input image according to the encoding tensor set and the attention map set, the encoding result of the input image recording an identity feature of a human face in the input image;
encoding an expression image to obtain an encoding result of the expression image, the encoding result of the expression image recording an expression feature of a human face in the expression image; and
generating an output image according to the encoding result of the input image and the encoding result of the expression image, the output image having the identity feature of the input image and the expression feature of the expression image, the encoding result of the expression image including n displacement maps, comprising:

performing spatial transformation processing, for each group of a corresponding processed encoding tensor and a corresponding displacement map, on the processed encoding tensor to obtain n transformed encoding tensors; and decoding the n transformed encoding tensors to generate the output image.

14. The non-transitory computer-readable storage medium according to claim 13, wherein obtaining the encoding result of the input image includes:

multiplying, for each group of the corresponding encoding tensor and the corresponding attention map in the encoding tensor set and the attention map set, the encoding tensor and the attention map to obtain the n processed encoding tensors, wherein the encoding result of the input image includes the n processed encoding tensors.

15. The non-transitory computer-readable storage medium according to claim 13, wherein the computer program instructions are executable by the at least one processor to further perform:

invoking a facial expression editing model, the facial expression editing model including a first encoder, a second encoder, and a decoder, wherein:

the first encoder is configured to encode the input image based on the attention mechanism to obtain the encoding tensor set and the attention map set of the input image, and to obtain the encoding result of the input image according to the encoding tensor set and the attention map set;

the second encoder is configured to encode the expression image to obtain the encoding result of the expression image; and the decoder is configured to generate the output image according to the encoding result of the input image and the encoding result of the expression image.

16. The non-transitory computer-readable storage medium according to claim 13, wherein the facial expression editing model is a model constructed based on a generative adversarial network, the facial expression editing model includes a generator and a discriminator, and the generator includes the first encoder, the second encoder, and the decoder, and wherein a training process of the facial expression editing model includes:

obtaining at least one training sample, each of the training sample being an image pair including an original image and a target image, the original image and the target image being two images of a same human face, and the original image and the target image having different expressions, wherein the generator is configured to generate an output image corresponding to the original image according to the original image and the target image, and the discriminator is configured to determine whether the output image corresponding to the original image and the target image are the image generated by the generator; and using the training sample to train the facial expression editing model.

17. The non-transitory computer-readable storage medium according to claim 13, wherein the computer program instructions are executable by the at least one processor to further perform:

generating a video or a dynamic picture including the output image.

* * * * *